United States Patent [19]
Lapetina

[11] 3,744,013
[45] July 3, 1973

[54] METHOD FOR SEARCHING A MEDIUM

[75] Inventor: Robert A. Lapetina, Salt Lake City, Utah

[73] Assignee: Edo Western Corporation, Salt Lake City, Utah

[22] Filed: Jan. 20, 1972

[21] Appl. No.: 232,521

Related U.S. Application Data

[63] Continuation of Ser. No. 884,538, Dec. 12, 1969, abandoned.

[52] U.S. Cl. .............................. 340/3 R, 343/5 PC
[51] Int. Cl. .............................................. G01s 9/66
[58] Field of Search..................... 340/1 R, 3 R, 3 F; 343/5 PC, 5 CM

[56] References Cited
UNITED STATES PATENTS 2,616,077  10/1952  Holser.............................. 343/5 PC
2,866,512  12/1958  Padberg, Jr......................... 181/0.5

Primary Examiner—Richard A. Farley
Attorney—C. Harvey Gold, David V. Trask et al.

[57] ABSTRACT

A method for searching a medium such as the subbottom of a body of water which includes transmitting a plurality of energy waves from a source through the medium to be searched, recording the energy wave reflection reflected by the medium at a predetermined point for each of a plurality of laterally spaced energy waves transmitted through the medium to produce an energy wave reflection recording of a section of the medium, and scanning the energy wave reflection recording to locate continuous areas of similarly recorded wave reflection intensity. A plurality of energy wave reflection recordings can be produced for spaced sections of the medium.

18 Claims, 6 Drawing Figures

PATENTED JUL 3 1973 3,744,013

INVENTOR.
Robert A. Lapetina
BY C. Harry Hold
His Attorney

INVENTOR.
Robert A. Lapetina
BY
His Attorney

METHOD FOR SEARCHING A MEDIUM

This is a continuation of application Ser. No. 884,538, filed Dec. 12, 1969 and now abandoned.

BACKGROUND OF THE INVENTION

It is often desirable to search a medium which is not generally accessible. For example, particularly with the advent of offshore drilling, a great number of crude oil pipelines have been placed in the subbottom of various bodies of water such as the Gulf of Mexico. Even though such pipelines are initially embedded in the subbottom in a known location, they are often moved substantial distances by dynamic forces resulting from turbulent water conditions. Accordingly, shortly after a pipeline has been laid its exact location oftentimes cannot be readily pinpointed even though this information is vital when other pipelines are to be laid in the subbottom area. As another example, submarines submerged under the polar ice cap occasionally need to raise to the water's surface. Accordingly, the ice cap must be searched to locate an opening therein so that the vessel can pass therethrough. A number of devices and methods have been proposed for searching mediums of the general type herein described but such devices and methods have generally proven to be unsatisfactory for accomplishing their intended purpose. Accordingly, a great need has arisen for a method which can be used to search a remote medium for identifiable objects, irregularities, and the like.

BRIEF DESCRIPTION OF THE INVENTION

A method for searching a medium which comprises transmitting a plurality of energy waves from at least one source through the medium to be searched; recording the energy wave reflection reflected by said medium at a predetermined point for each of a plurality of laterally spaced energy waves transmitted through said medium to produce an energy wave reflection recording of a section of the medium; and scanning the energy wave reflection recording to locate substantially continuous areas of similar recorded energy wave reflection intensity.

In another embodiment of the invention, a plurality of energy wave reflections are recorded which are reflected from each of a plurality of points in the medium for each of said energy waves transmitted through the medium to provide a plurality of energy wave reflection recordings of spaced medium sections.

In another embodiment of the invention, the energy waves are sound waves and the recording of the energy wave reflections is a printed recording.

In yet another embodiment of the invention the medium searched in the subbottom of a body of water and the searching is accomplished by positioning an energy wave source to transmit energy waves towards said subbottom; transversely sweeping the energy wave source laterally back and forth to transmit energy waves along a predetermined plane through the subbottom; longitudinally moving the energy wave source at a predetermined speed over the bottom of the body of water; recording the energy wave reflection reflected by said medium at a predetermined level below the bottom of a body of water for each of a plurality of energy waves as said energy wave source sweeps back and forth and longitudinally moves over the bottom of the body of water wherein a recording is obtained for at least one section of the subbottom; and scanning the recording of the sound wave reflections to locate recognizable areas of similar recorded sound wave reflection intensity.

BRIEF DESCRIPTION OF THE DRAWINGS

So that the invention may be more readily understood and carried into effect reference is made to the accompanying drawings which are offered by way of example only and are not to be taken as limiting the invention, the scope of which is defined by the appended claims which are intended to embrace equivalent processes.

DESCRIPTION OF THE PREFERRED EMBODIMENT

Figures 1, 3:
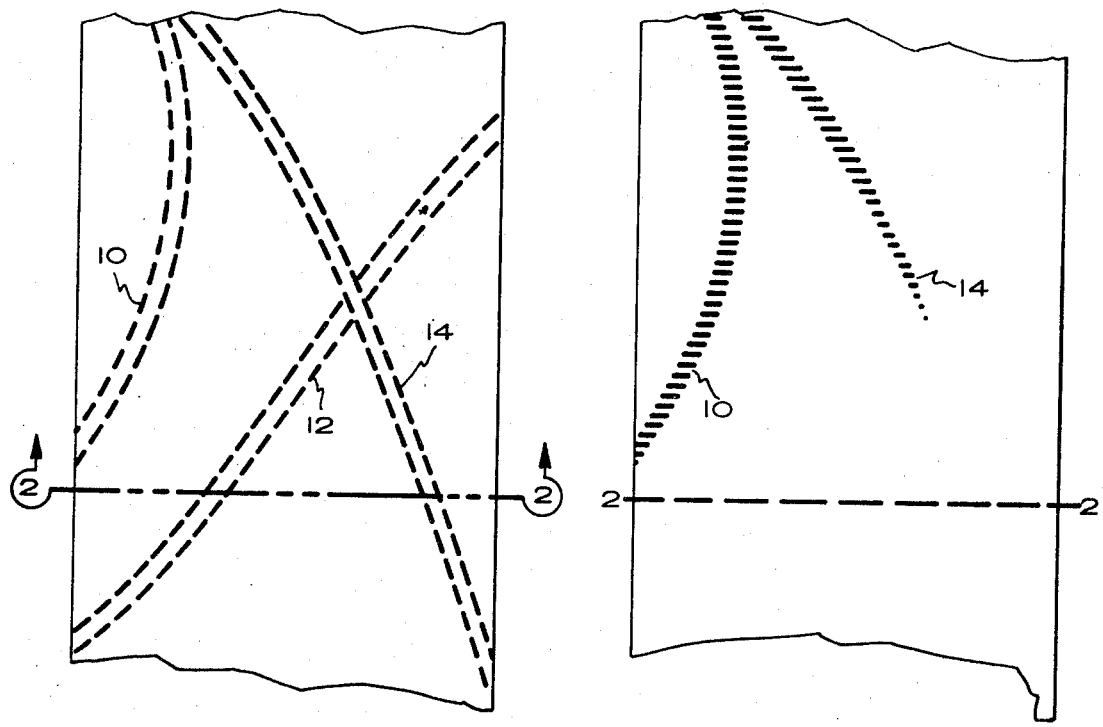
FIG. 1 is a plan view of a portion of the subbottom to be searched by the method of the invention showing pipelines embedded in the subbottom area.
FIG. 3 is a representation of a printed energy wave reflection recording of a first section of the subbottom area being searched according to the method of the invention.

As illustrated in FIG. 1 of the drawings, objects such as pipelines 10, 12, and 14, can be embedded in the subbottom area 16 of a body of water 18. When a recording of energy wave reflections of a vertical section of the subbottom, i.e., a section that is taken parallel with the direction of travel of the energy waves, is made in accordance with established practices, the pipelines are generally indistinguishable from other subbottom objects because their relatively small cross-sectional areas appear similar to the general sediment characteristics of the subbottom on the energy wave reflection recording. However, when a generally horizontal section of the subbottom area is recorded, i.e., a section taken perpendicular with the direction of travel of the energy waves such as sections 20 and 22 illustrated in FIG. 2, it clearly shows substantially continuous areas of energy wave reflection intensity which are easily recognizable as pipelines rather than subbottom sediment (see FIG. 3 which represents a recording of subbottom section 20 and FIG. 4 which represents a recording of subbottom section 22).

Figure 4:
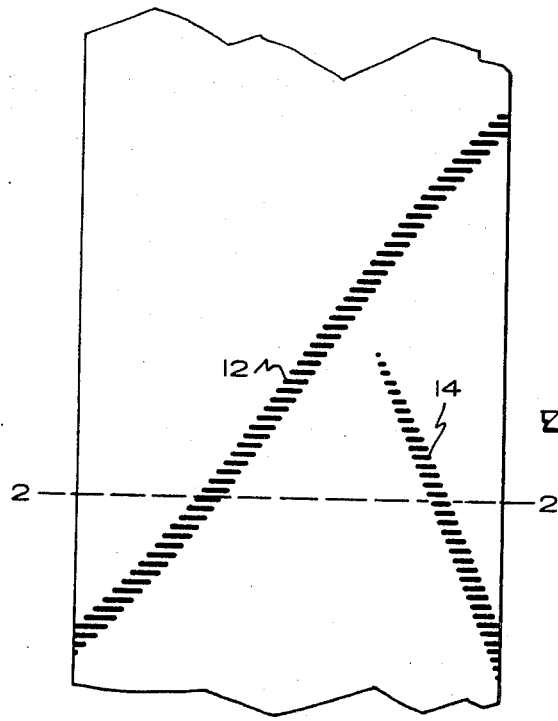
FIG. 4 is a printed energy wave reflection recording of a second subbottom section vertically spaced from the first section.

Perpendicular recordings of the type illustrated in FIG. 3 and FIG. 4 are obtained by transmitting energy waves such as sound waves, light waves, electromagnetic waves, etc., through a predetermined distance of the medium to be searched, e.g., subbottom sediment 16, from an energy wave source positioned to direct energy waves towards the medium. An energy wave reflection, reflected by the medium at a predetermined point therein, for each of a plurality the transversely spaced apart energy waves is received and recorded as hereinafter described. The recording thus produced represents a section of the medium generally perpendicular to the direction of travel of the energy waves penetrating the medium, e.g., generally horizontal section 20 or 22 of subbottom 16.

Parallel recordings of medium sections are to be distinguished from the perpendicular sections referred to herein. Parallel recordings are formed by recording a plurality of reflections for each energy wave transmitted through the medium so that for any one energy wave a line of reflections is recorded which passes through the energy wave source, i.e., the energy wave reflection recording for each energy wave is a line parallel with the direction of energy wave travel. On the other hand, energy wave reflection recordings produced according to the method of this invention rely upon only a single reflection point for each energy wave transmitted. When this reflection point is recorded together with reflection points of energy waves laterally spaced thereapart from the first energy wave, an energy wave reflection recording is produced of a section which does not pass through the energy wave source, i.e., the section is perpendicular to the direction of energy wave transmittal at the point at which the reflection is taken for any given energy wave. However, it is to be noted that while the section is referred to herein as being perpendicular it can be curved as well as plane.

Figure 2:
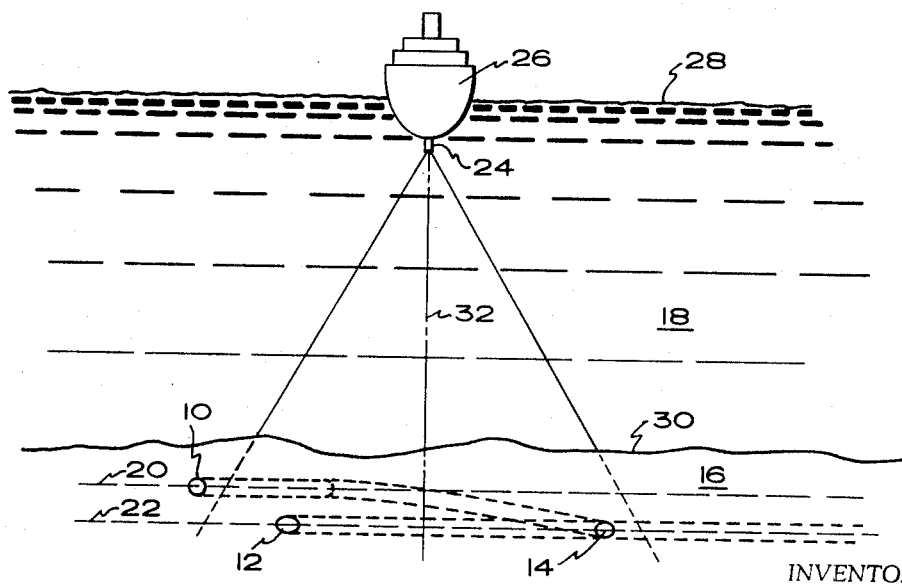
FIG. 2 is a vertical sectional view of the subbottom area taken in the plane of line 2—2 of FIG. 1 looking in the direction of the arrows.
Figure 5:
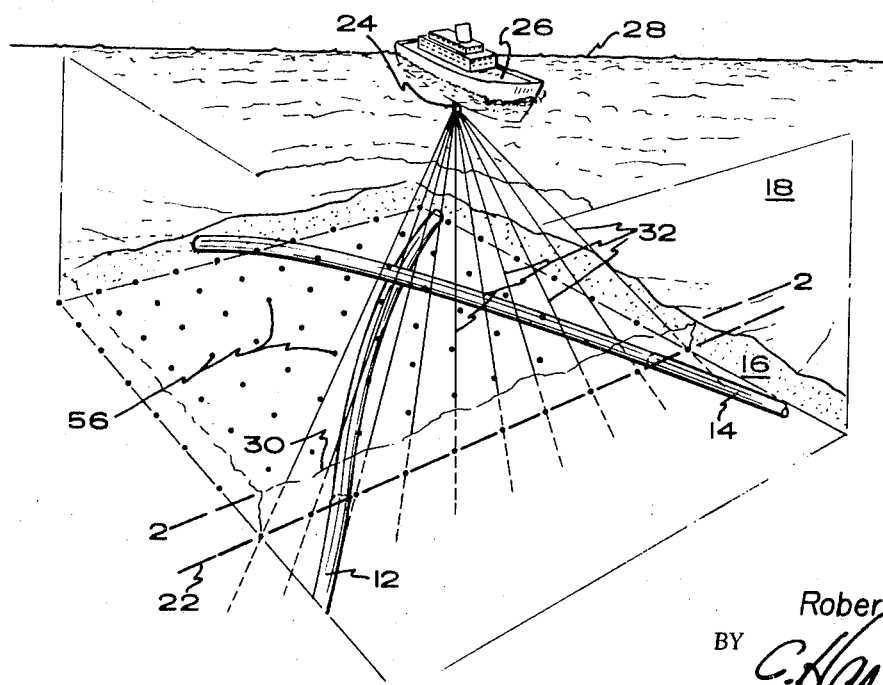
FIG. 5 is a three dimensional perspective view of a medium being searched according to the method of the invention.

While the method of this invention can be used to accomplish a great variety of useful purposes one of its most practical uses is in locating pipelines embedded in the subbottom of a body of water. For this reason the invention will be described in detail as it pertains to searching a subbottom medium for embedded pipelines. As shown in FIG. 2, an energy wave source such as sound wave transducer 24 is attached to vessel 26, preferably below the surface 28 of water 18, to direct sound waves towards bottom 30. Source 24 is swept back and forth lateral to the direction of movement of vessel 26 so that energy waves are transmitted over the entire subbottom area to be searched as the vessel moves along the area. Preferably, the energy wave source is swept laterally back and forth through an arc of ± 2° to 45° with respect to the vertical shown as line 32 of FIG. 2. In addition, while the energy wave source is swept back and forth it is moved longitudinally in a direction of 45° to 135° from the line of sweep of said energy wave source and most preferably substantially perpendicular with said line of sweep. The surface vessel is moved at a predetermined speed calculated to allow the energy waves to thoroughly saturate the search area as shown in FIG. 5.

In a preferred embodiment of the invention energy wave reflection recordings are obtained for a plurality of spaced medium sections, e.g., sections 20 and 22. This is accomplished by recording a plurality of energy wave reflections for each energy wave transmitted through the medium. The spacing of the sections is determined by the size of the object which is to be located. In the case of pipelines, for example, the spacing between the sections is preferably ½ to 6 feet and most preferably 1 to 4 feet.

FIGS. 1 through 5 illustrate a typical subbottom search conducted according to the method of the invention. As shown in FIG. 2, when a vertical section 2—2 is taken through the subbottom 16 of a body of water, pipeline 10 is positioned at level 20 and pipelines 12 and 14 are positioned at lower level 22. As herein described, when a vertical energy wave reflection recording is made of the section 2—2, pipelines 10, 12 and 14 cannot be easily identified because the pipelines appear very similar to the other subbottom sediment. Accordingly, at horizontal energy wave reflection recordings are made at spaced levels 20 and 22 which are illustrated in FIGS. 3 and 4 respectively. Because the longitudinal surface area of the pipe is substantially greater than the pipe's vertical cross sectional area the pipelines appear on the horizontal recordings as substantially continuous areas of similar recorded energy wave reflection intensity which are easily recognizable as pipes.

The precise vertical positioning of each pipeline can be determined by selecting the locations of the vertical levels in the subbottom area that are recorded. As can be seen in FIGS. 3 and 4 pipelines 10 and 12 are positioned along their entire length at levels 20 and 22 respectively. However, pipeline 14 is located along a portion of its length at subbottom level 20 and along another portion of its length at level 22. It is to be noted that inasmuch as energy waves travel at a substantially constant speed through a substance having relatively uniform density the energy wave reflection recording equipment can be easily programed to record the reflection obtained from a predetermined point or level in the medium searched.

Energy wave reflections are continually returned to source 24 as the waves travel through water 18 as well as through subbottom 16. Source 24 is preferably a two way device which converts the reflections to energy pulses when the reflections contact it. The energy pulses thus formed are then transmitted to a receiver which in turn transmits predetermined pulses to a recorder. Because the energy waves and energy wave reflections travel at known uniform speeds the receiver can be easily programed to transmit only energy wave reflections to the recorder that are reflected by the medium at a predetermined point or level spaced from the energy wave source. The distance between the source and the level in the medium to be searched will, of course, vary when a laterally sweeping energy wave source is used as shown in FIG. 5. Once again, because of the relative constant speed of the energy waves and energy wave reflections the receiver can be programed with a conventional computer to compensate for the variation in spacing between the energy wave source and the point in the search medium to be recorded.

Figure 6:
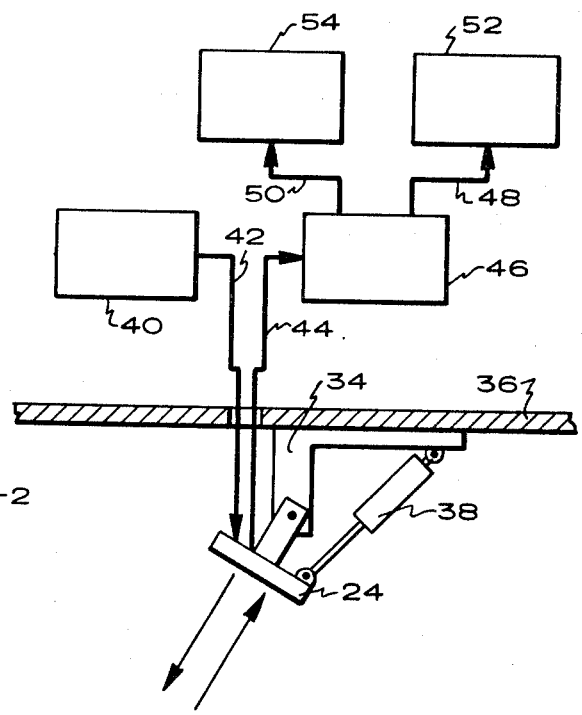
FIG. 6 is a schematic representation showing one form of apparatus which can be used to practice the method of the invention.

FIG. 6 illustrates in block form the general components of one type of apparatus that can be used for practicing the searching method herein described. As shown, an energy wave source 24 such as The Model 202 narrow beam two way piezoelectric transducer manufactured and sold by the Edo Western Corporation of Salt Lake City, Utah, is swingingly mounted to a support frame 34 attached to the bottom 36 of vessel 26 with activation means 32 which rock the transducer laterally back and forth in a programed fashion with respect to the longitudinal direction of movement of vessel 26. For example, the Model 377 Mechanically Stabilized Platform manufactured and sold by Edo Western Corporation can be used to support and rock the transducer. Programed electrical impulses produced by pulse control mechanism 40 are transmitted along line 42 to transducer 24 which converts the electrical impulses to energy waves 32 such as sound waves having a frequency which enable the waves to penetrate a predetermined distance through the medium to be searched. Energy wave reflections obtained when the energy waves strike the medium are reflected back to two way transducer 24 which converts the reflections to electrical impulses that are then transmitted along line 44 to programmed receiver and transmitter 46. Receiver and transmitter 46 serves a dual purpose. Firstly, it is programed to sort the reflection pulses and locate the pulses representing sound wave reflections for sound waves striking predetermined points in the medium 16. Secondly, receiver and transmitter 46 transmit the selected reflections to a precision recorder. For example, when reflection recordings are being made of two horizontal sections, e.g., a first section at level 20 and a second section at level 22, electrical pulses are transmitted along either line 48 or 50 to recorders 52 or 54 respectively depending on the level of the medium for which the energy wave is reflected. A device currently on the market which uses components capable of obtaining a precision recording of subbottom sediment is the Model 415 Accoustic Subbottom Profiling System also manufactured and sold by the Edo Western Corporation. This system uses a piezoelectric transducer to provide an extremely short, high power sound wave pulse at ½ to 2 cycles of signal frequency which allows high resolution of subbottom information. A time varied gain receiver is used in the system which permits a low receiver gain prior to receipt of the first subbottom echo with rapid increase in gain following the bottom signal to accentuate the subbottom data. The received data is then displayed on a conventional precision Bathymetric recorder wherein energy wave reflections obtained from points in the medium having similar density are marked with similar intensity on the recorder's printed display.

In a preferred embodiment of the invention energy wave reflections transmitted to the medium to be searched are recorded for intervals at 0.01° to 1.0° as the transducer is transversely swept over the area to be searched and the energy wave reflections for each transverse sweep are recorded along a transverse line on the recorder's printed display chart. Then when the transducer swings back over the area to be searched, the chart longitudinally moves so that the recordings of the transducer's back swing are along another line substantially parallel with and spaced apart from the first printed line. Accordingly, the concentration of sound wave reflection readings on the recorder's display chart, (representing medium reflection points 56 in FIG. 5 of the drawings) is determined by the speed of the vessel 26 and the transverse interval between the sound waves as they are transmitted through the medium.

I claim:

1. A method for searching a medium which comprises transmitting to the medium to be searched a plurality of laterally-spaced energy waves capable of penetrating a predetermined distance through said medium; recording the energy wave reflection of each of said laterally-spaced energy waves reflected by said medium from points at a selected subsurface level within said medium; repeating the aforedescribed transmitting and recording procedures, transmitting to laterally-spaced points at said selected subsurface level longitudinally spaced from said first named points; and displaying said recorded energy wave reflections to represent a substantially horizontal layer of said medium, thereby to locate substantially continuous areas of similar energy wave reflection intensity.

2. The method of claim 1 wherein a plurality of energy wave reflections are recorded which are reflected from a plurality of points in said medium for each of said energy waves transmitted through said medium to provide a plurality of energy wave reflection recordings of spaced medium sections.

3. The method of claim 1 wherein said energy waves are sound waves.

4. The method of claim 1 wherein said medium is the subbottom of a body of water.

5. The method of claim 4 wherein said energy waves are sound waves.

6. A method for locating objects in the subbottom of a body of water which comprises:
   a. transmitting a plurality of laterally-spaced energy waves from a source towards the bottom of said body of water, said energy waves being capable of penetrating a predetermined distance into the subbottom of said body of water;
   b. recording the energy wave reflection of each of said laterally-spaced energy waves reflected by said subbottom from points at a selected subsurface level within said subbottom;
   c. repeating the aforedescribed transmitting and recording procedures, transmitting to laterally-spaced points at said subsurface level longitudinally spaced from said first named points; and
   d. displaying said recorded energy wave reflections to represent a substantially horizontal layer of said subbottom, thereby to locate substantially continuous areas of similar energy wave reflection intensity.

7. The method of claim 6 wherein a plurality of energy wave reflection recordings are obtained for energy wave reflections produced by said energy waves along vertically spaced sections at predetermined levels below the bottom of said body of water.

8. The method of claim 7 wherein at least four energy wave reflection recordings are obtained for sections spaced apart from each other 1 to 6 feet.

9. The method of claim 6 wherein said energy waves are sound waves.

10. The method of claim 6 wherein the recording of energy wave reflections is a printed recording.

11. A method for locating objects in the subbottom of a body of water which comprises:
   a. positioning an energy wave source for producing energy waves capable of penetrating the subbottom of said body of water, such that energy waves produced by said source are directed towards said subbottom;
   b. sweeping said energy wave source laterally back and forth to transmit energy waves to points laterally spaced along a line within a predetermined plane through said subbottom;
   c. recording the energy wave reflections produced by said energy waves when said energy waves reach said points;
   d. longitudinally moving said energy wave source at a predetermined speed with respect to the bottom of said body of water and repeating steps (b) and (c); and
   e. displaying the recordings of said energy wave reflections to represent a substantially horizontal layer of said subbottom, thereby to locate substantially continuous and recognizable areas of similar recorded sound wave reflection intensity.

12. The method of claim 11 wherein said energy waves are sound waves.

13. The method of claim 11 wherein energy wave reflection recordings are obtained for a plurality of spaced subbottom sections.

14. The method of claim 11 wherein said energy wave source is swept laterally back and forth through an arc of ± 2° to 45°.

15. The method of claim 14 wherein said energy wave source is moved longitudinally in a direction 45° to 135° from the line of sweep of the energy wave source.

16. The method of claim 15 wherein the recording of the energy wave reflections is a printed recording.

17. The method of claim 16 wherein said energy waves are sound waves.

18. The method of claim 17 wherein sound wave reflection recordings are obtained for a plurality of spaced subbottom sections.

* * * * *